United States Patent [19]

Kubo

[11] Patent Number: 5,525,787
[45] Date of Patent: Jun. 11, 1996

[54] SYMBOL INFORMATION READING APPARATUS

[75] Inventor: Mitsunori Kubo, Tokyo, Japan

[73] Assignee: Olympus Optical Co., Ltd., Tokyo, Japan

[21] Appl. No.: 292,602

[22] Filed: Aug. 18, 1994

Related U.S. Application Data

[63] Continuation of Ser. No. 972,958, Nov. 6, 1992, abandoned.

[30] Foreign Application Priority Data

Nov. 11, 1991 [JP] Japan ................................. 3-294375

[51] Int. Cl.$^6$ ................................................. G06K 7/10
[52] U.S. Cl. ........................................ 235/462; 235/472
[58] Field of Search .................................. 235/472, 462, 235/494, 470

[56] References Cited

U.S. PATENT DOCUMENTS

| | | | |
|---|---|---|---|
| 4,323,772 | 4/1982 | Serge | 235/463 |
| 4,449,052 | 5/1984 | Krieg | 235/462 |
| 4,897,880 | 1/1990 | Wilber et al. | 382/13 |
| 4,982,075 | 1/1991 | Aoki et al. | 235/494 |
| 5,073,954 | 12/1991 | Van Tyne | 235/494 |
| 5,101,096 | 3/1992 | Ohyama | 235/494 |
| 5,229,591 | 7/1993 | Heiman et al. | 235/472 |
| 5,235,172 | 8/1993 | Oehlmann | 235/494 |
| 5,258,605 | 11/1993 | Metlitsky | 235/470 |
| 5,270,525 | 12/1993 | Ukai | 235/462 |

FOREIGN PATENT DOCUMENTS 0384955  9/1990  European Pat. Off. .

*Primary Examiner*—Harold Pitts
*Attorney, Agent, or Firm*—Frishauf, Holtz, Goodman, Langer & Chick

[57] ABSTRACT

A bar code symbol picked-up by a two-dimensional image pickup device is stored in a frame memory. A data processing unit automatically recognizes whether the bar code symbol is present or not, based on the information stored in the frame memory, that is, the image pickup data. If the bar code symbol is present, the information of the bar code symbol projected on a photoelectric conversion surface of the two-dimensional image pickup device is read and decoded to the original information. The bar code symbol can be recognized automatically by the following methods of monitoring a variation in density of the image pickup data, monitoring a spatial frequency component of the image pickup data, monitoring whether a predetermined bar code pattern is formed in the image pickup data, monitoring widths of bars and spaces in the image pickup data, monitoring the number of edges of bars and spaces in the image pickup data, monitoring a correlation among the image pickup data obtained by a plurality of image pickup operations of the image pickup device, etc.

6 Claims, 9 Drawing Sheets

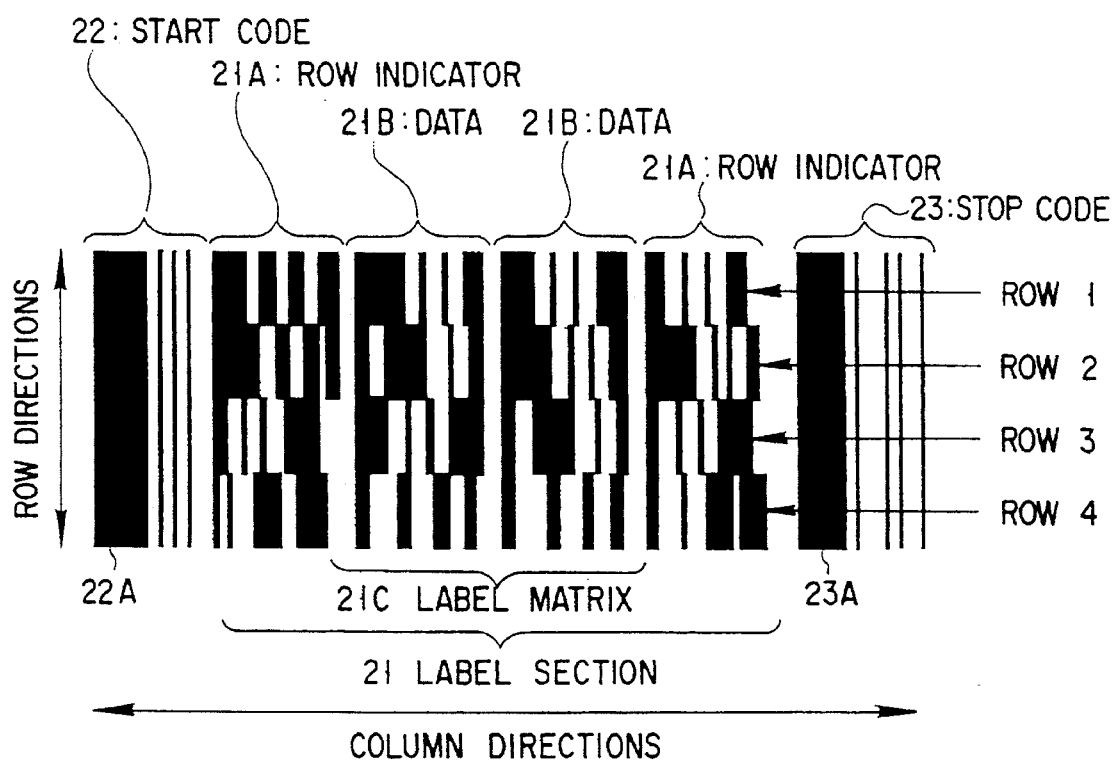
F I G. 2
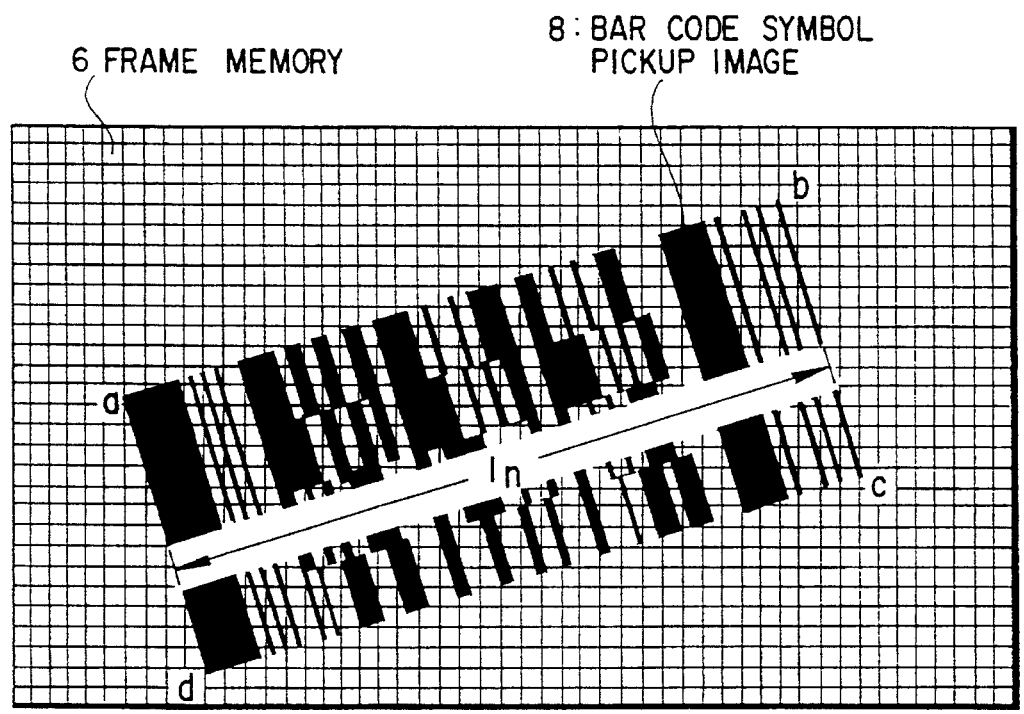
F I G. 3

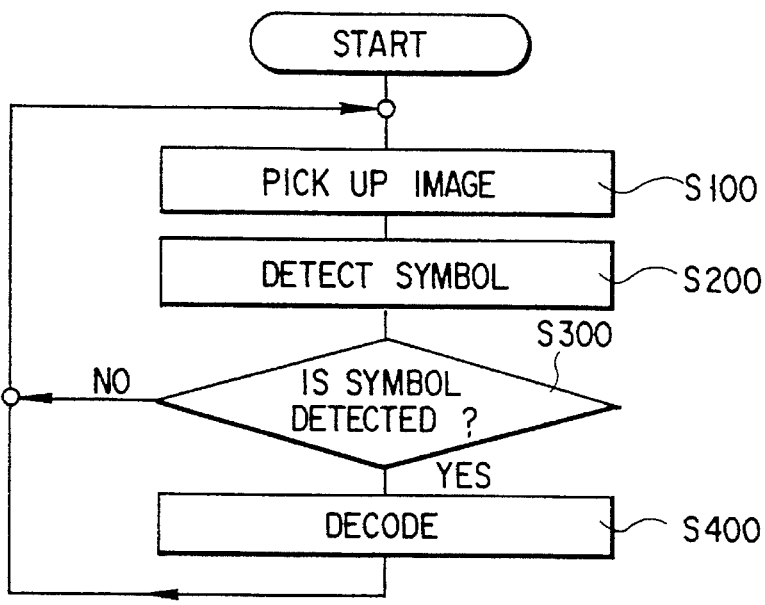
F I G. 4
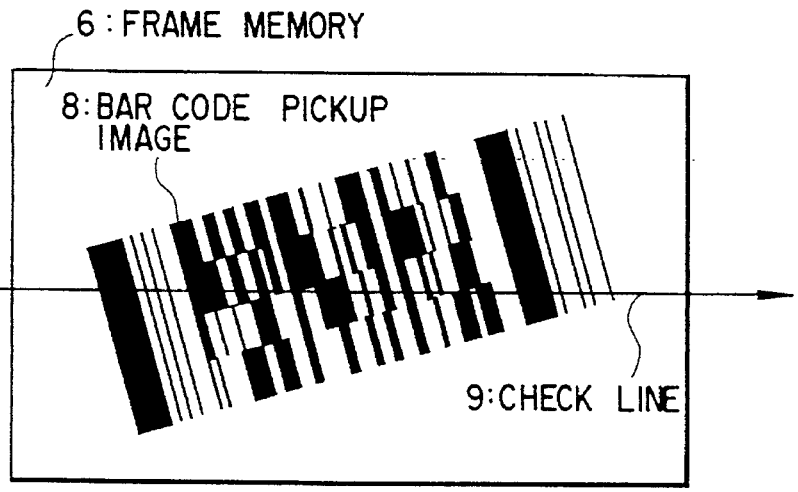
F I G. 5
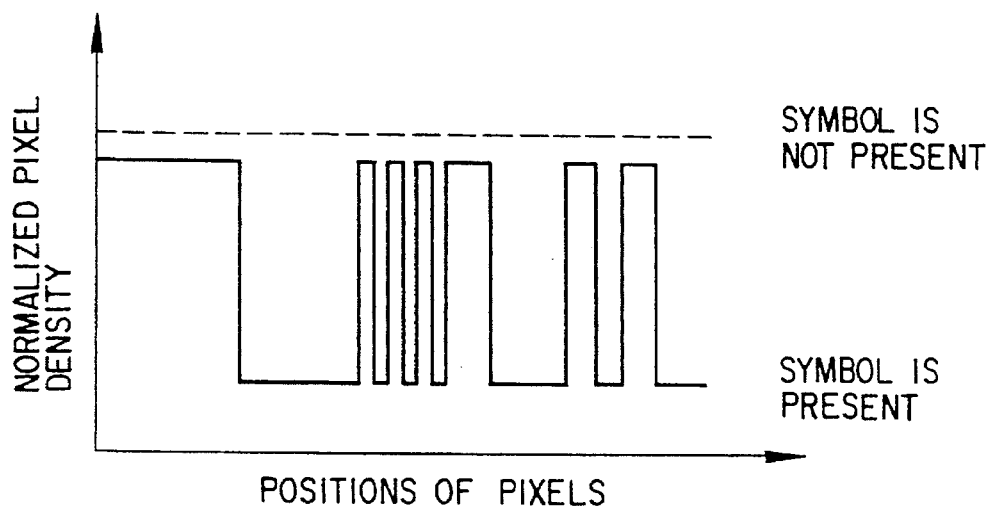
F I G. 6

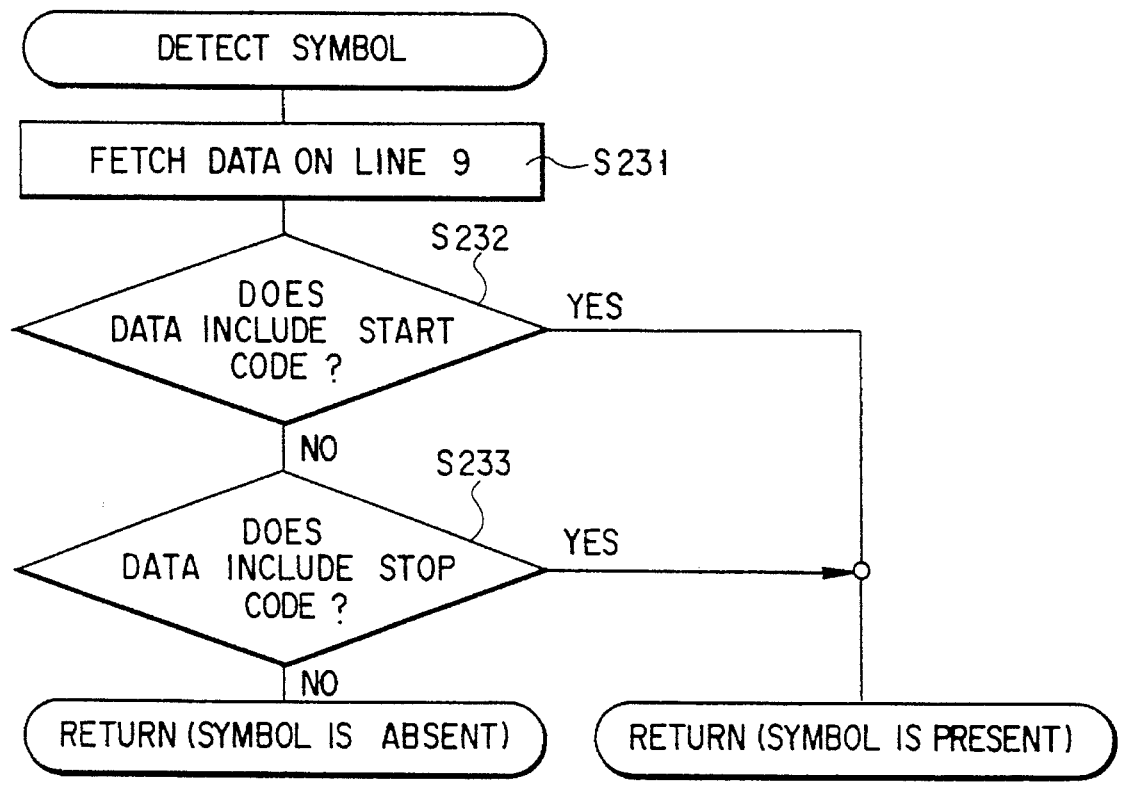
F I G. 11
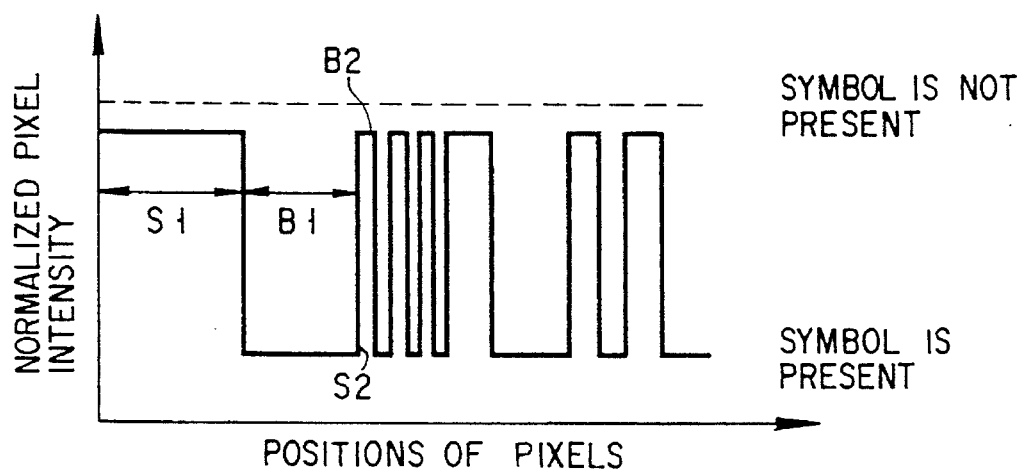
F I G. 12

SYMBOL INFORMATION READING APPARATUS

This application is a Continuation of application Ser. No. 07/972,958, filed Nov. 6, 1992, now abandoned.

BACKGROUND OF THE INVENTION

1. Field of the Invention

The present invention relates to a symbol information scanning apparatus for scanning symbol information such as a bar code.

2. Description of the Related Art

As a result of the growing use of POS (point of sales) systems, bar codes have become quite well-known to the general public. A bar code is a type of symbol including characters in the form of bars and spaces of different widths, which are arranged in parallel. When necessary, the symbol includes characters each having a check digit. The symbol also includes start and stop characters at the beginning and end, respectively, and margins next to the start and stop characters.

In Japan, the JAN (Japanese Article Number) code is a standard bar code and is widely used for consumer goods. The bar code is also used as a physical distribution symbol which is constituted by adding physical distribution identification codes of a single or double figure to the beginning of the JAN code.

The above types of bar code are so-called one-dimensional bar codes and are able to store information of at most several tens of bytes. However, as there is a growing demand for bar codes able to store larger amounts of information, various so-called two-dimensional bar code symbol systems have been developed. It is characteristic of the two-dimensional bar codes to encode considerably larger amounts of information than the one-dimensional bar code. One type of two-dimensional bar code is a stacked bar code which is formed by a plurality of one-dimensional bar codes to increase the amount of information. For example, a PDF-417 bar code is used as the type of stacked bar code.

A known conventional laser scan type apparatus is that disclosed in EP 0 384 955 A2 (Date of Publication of Application: 90.9.5), which is a symbol information scanning apparatus for scanning two-dimensional bar codes. In this apparatus, bar code symbol information is scanned by two-dimensional scanning of a laser beam and decoded. However, since this conventional scanning apparatus requires that users depress a scanning switch to issue a scanning start command, it cannot be operated automatically.

SUMMARY OF THE INVENTION

It is accordingly an object of the present invention to provide a symbol information scanning apparatus for automatically starting a scan of symbol information.

According to a first aspect of the present invention, there is provided a symbol information reading apparatus for reading a bar code symbol including bars and spaces, comprising:

an image pickup device for picking up an image of the bar code symbol and for outputting an image pickup data;

recognizing means for automatically recognizing whether the bar code symbol is present, based on the image pickup data output from the image pickup device; and decoding means for decoding the image pickup data output from the image pickup device when the recognizing means recognizes that the bar code symbol is present.

According to a second aspect of the present invention, there is provided a symbol information reading apparatus for reading a bar code symbol including bars and spaces, comprising:

an image pickup device for picking up an image of the bar code symbol and for outputting an image pickup data;

recognizing means for automatically recognizing whether the bar code symbol is present, based on the image pickup data output from the image pickup device; and instruction means for instructing a decoding start of the image pickup data output from the image pickup device when the recognizing means recognizes that the bar code symbol is present.

In the present invention described above, an image of a bar code symbol is formed on a photoelectric conversion surface of an image pickup device, e.g., a two-dimensional image pickup device, and an image pickup data such as a video signal is output from the two-dimensional image pickup device. A recognizing means recognizes whether the bar code symbol is present or not, in response to the image pickup data output from the two-dimensional image pickup device. If the bar code symbol is present, then the decoding operation of the signal is started.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a view of a bar code symbol of a stacked bar code PDF-417;

FIG. 3 is a schematic view of a bar code symbol image of the stacked bar code PDF-417 which is virtually projected on a pixel array of a frame memory;

FIG. 4 is a main flowchart schematically showing an operation of the symbol information scanning apparatus shown in FIG. 1;

FIG. 5 is a view showing a check line for explaining a symbol recognition algorithm in the symbol information scanning apparatus shown in FIG. 1;

FIG. 6 is a view showing the intensity of image data on the check line shown in FIG. 5;

FIG. 11 is a flowchart showing a symbol detection routine according to a third embodiment;

FIG. 12 is a view showing the intensity of image data for explaining a symbol recognition algorithm according to a fourth embodiment;

DETAILED DESCRIPTION OF THE PREFERRED EMBODIMENT

(First Embodiment)

Figure 1:
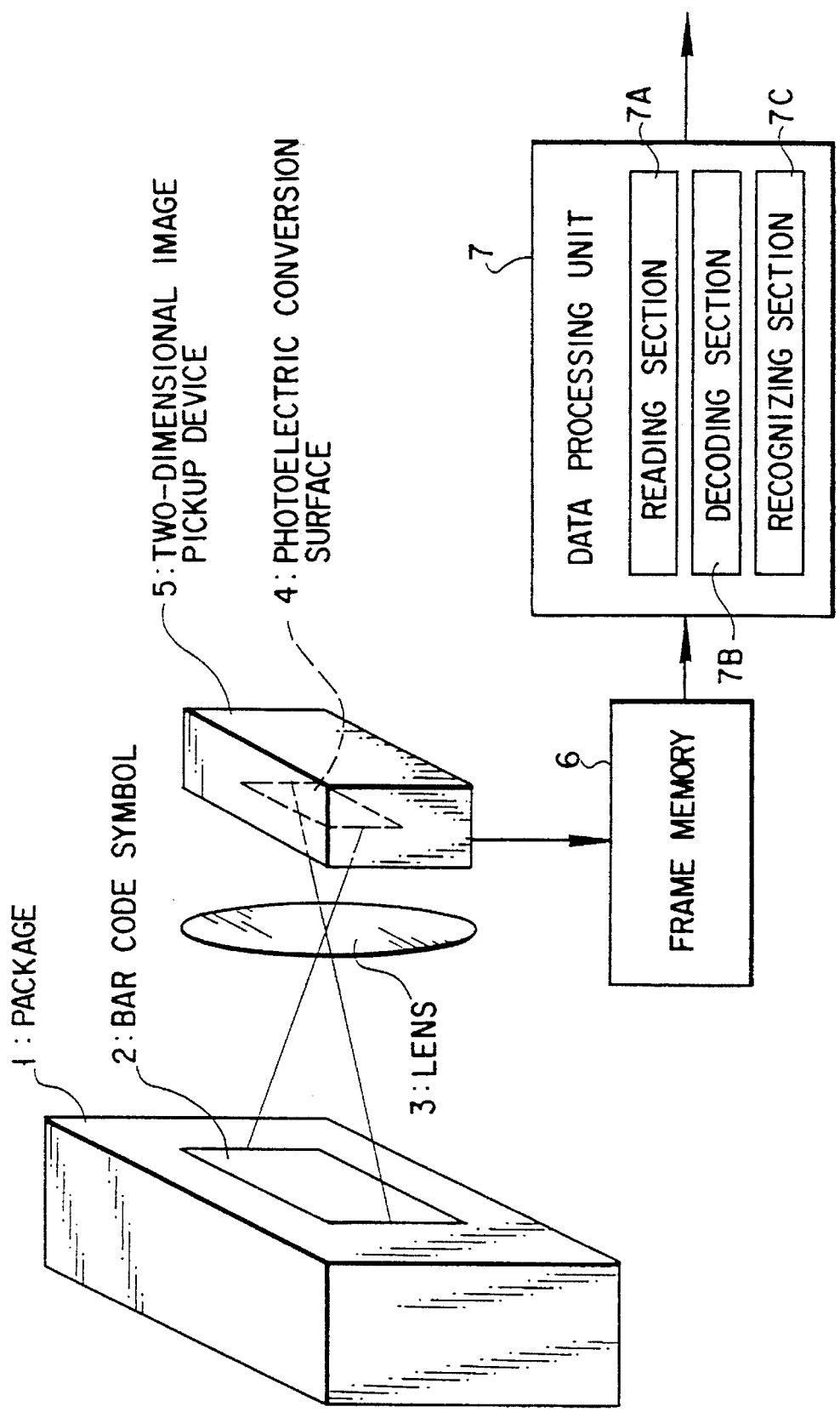
FIG. 1 is a view of a structure of a symbol information scanning apparatus according to a first embodiment of the present invention.

FIG. 1 is a view showing a structure of a symbol information scanning apparatus according to the first embodiment. The symbol information scanning apparatus comprises an image forming lens 3, a two-dimensional image pickup device 5, a frame memory 6, and a data processing unit 7. The data processing unit 7 includes a CPU and memories, neither of which is shown, and also includes a reading section 7A for reading bar code information in sequence, a decoding section 7B for decoding the bar code information scanned by the reading section 7A, and a recognizing section 7C for automatically recognizing that the bar code information starts to be decoded.

A two-dimensional bar code symbol printed on a package 1, that is, a bar code symbol 2 of a PDF-417 format is imaged through the image forming lens 3 on a photoelectric conversion surface 4 formed in the two-dimensional image pickup device 5. Image information into which the bar code symbol is photoelectrically converted by the two-dimensional image pickup device 5, is supplied to the frame memory 6.

FIG. 2 shows a structure of the bar code symbol 2 of the PDF-417 format. The bar code symbol 2 includes a label section 21 of information components to be decoded, which is constituted by bar code characters each having bars and spaces, a start code 22 of a start character arranged at the beginning of the label section 21, and a stop code 23 of a stop character arranged at the end of the label section 21. Each of the bar codes other than the stop code 23 has four bars and spaces. The start and stop codes 22 and 23 start with big bars 22A and 23A, respectively. The label section 21 includes row indicators 21A adjacent to the start and stop codes 22 and 23, and a label matrix 21C having a plurality of data columns 21B which is interposed between the row indicators 21A and in which data is actually stored. The row indicator 21A includes information of the length and width of the symbol, a security level thereof, and the like. If, therefore, the information of the row indicator 21A is decoded, the size of the symbol, etc. can be determined. As shown in FIG. 2, the label matrix 21C is a 4×2 matrix having four rows and two columns.

FIG. 3 schematically shows a symbol image of the PDF-417 format having a 4×1 label matrix which is virtually projected on a main pixel array of the frame memory 6. FIG. 4 is a main flowchart schematically showing the algorithm processed by the data processing unit 7. In this specification, the flowchart is shown in accordance with programs written in C programming language.

The data processing unit 7 fetches image data from the two-dimensional image pickup device 5 to the frame memory 6 by an image pickup routine of step S100. Then, it evaluates the fetched image data in accordance with the algorithm for automatically recognizing that the image data starts to be read, by a symbol detection routine of step S200, which will be described in detail. In step S300, when it is determined from a result of the evaluation that no symbol is present, the flow is returned to the image pickup routine of step S100. On the other hand, in the step S300, when it is determined that a symbol is present, the flow advances to the next decoding routine in step S400. Therefore, the flow does not go out of a loop of "fetch of image data (the image pickup routine)" and "evaluation of image data (the symbol detection routine)" until it is determined that a symbol is present. If a symbol is present, bar code information is decoded by the decoding routine, and the decoded information is transmitted to a host computer (not shown).

The algorithm for automatically recognizing the start of decryption of the image data, will now be described.

Figure 7:
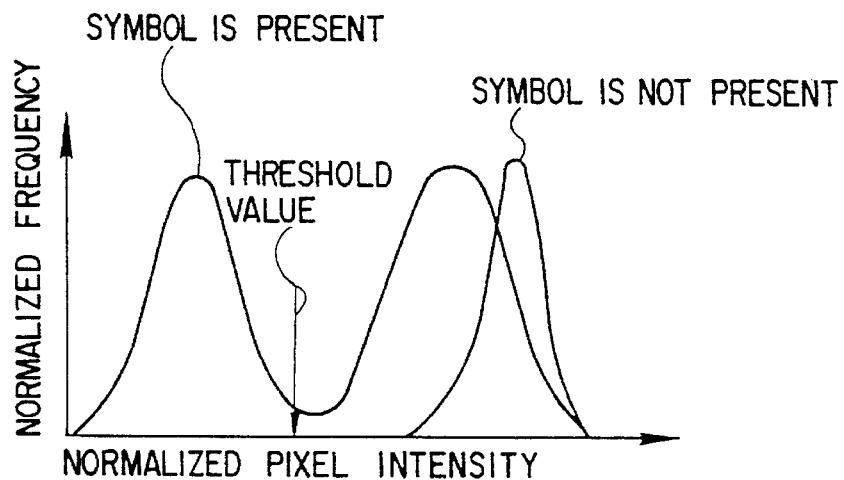
FIG. 7 is a histogram of the intensity of image data on the check line shown in FIG. 5.

As shown in FIG. 5, a check line 9 is defined on the frame memory 6. If a symbol is present in the frame memory as shown in FIG. 5, the intensities of pixels on the check line 9 are high and low, as shown in FIG. 6. If no symbol is present therein, they are substantially the same, as indicated by a dotted line in FIG. 6. A histogram of the pixels in the former case and that of the pixels in the latter case are clearly different from each other in frequency distribution, as shown in FIG. 7. If a threshold value is determined in advance, as shown in FIG. 7, and the number of pixels whose intensities are not higher than the threshold value is not less than a prescribed number, it is then determined that a symbol is present.

Figure 8:
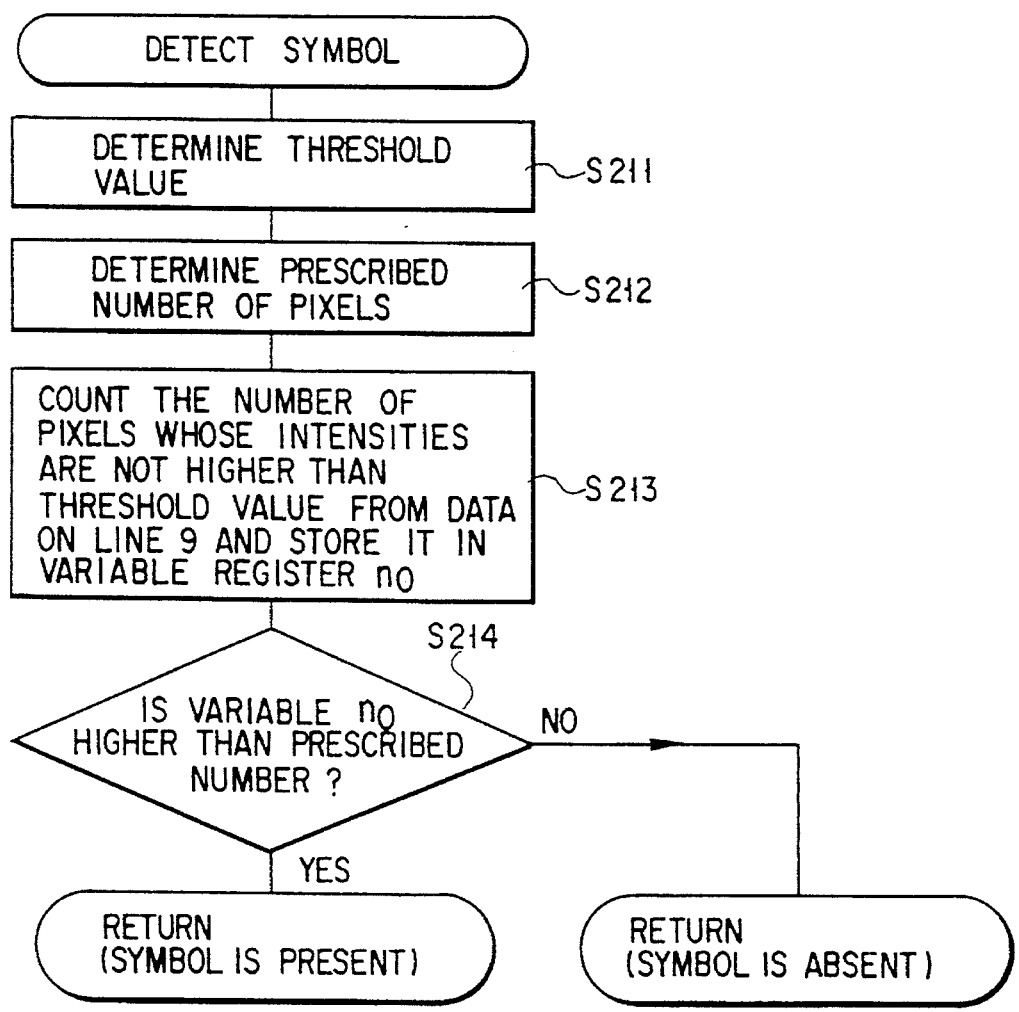
FIG. 8 is a flowchart minutely showing a symbol detection routine shown in FIG. 4.

The algorithm described above, that is, the symbol detection routine of step S200 shown in FIG. 4, is flow-charted as shown in FIG. 8. The threshold value of the histogram is set in step $211, and the prescribed number of pixels for determining whether a symbol is present or absent, is set in step S212. In step S213, the total number of pixels whose intensities are not higher than the threshold value is counted and stored in a variable ($n_0$) register. It is then determined in step S214 whether the variable $n_0$ exceeds the prescribed number of pixels. If yes, the flow returns to the main flowchart with an information representing that a symbol is present. If no, the flow returns to the main flowchart with an information representing that a symbol is absent.

As is evident from the above, since the bar code symbol is monitored by using the histogram, the apparatus can be started automatically.

The histogram of image data on the check line 9 can be replaced with a histogram of image data in the entire frame memory or a histogram of image data in a central part of the frame memory. The image data of these histograms is compared with a threshold value to determine whether a symbol is present or not in the frame memory.

(Second Embodiment)

A symbol information scanning apparatus according to the second embodiment of the present invention will now be described. Since the second embodiment is the same as the first embodiment except for the algorithm for automatically recognizing the start of decryption of image data, only the algorithm of the second embodiment will be described hereafter.

Figure 9:
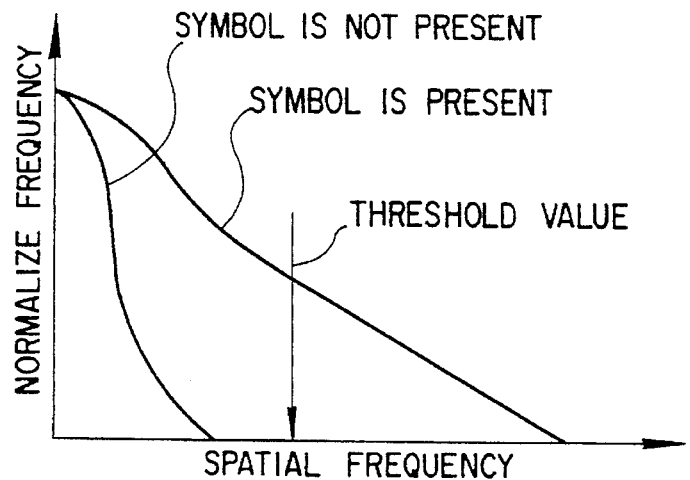
FIG. 9 is a graph showing Fourier transformation of image data on the check line, for explaining a symbol recognition algorithm of a symbol information scanning apparatus according to a second embodiment of the present invention.

Like in the first embodiment, an arbitrary check line 9 is defined on the frame memory 6, as shown in FIG. 5. If a symbol is present in the frame memory, the intensities of pixels on the check line 9 are high and low, as shown in FIG. 6. If no symbol is present therein, they are virtually the same. If data of the pixels is one-dimensionally Fourier-transformed, a graph shown in FIG. 9 is obtained. It is thus apparent from FIG. 9 that a distribution curve extends to a high spatial frequency when a symbol is present in the frame memory. A threshold value is determined in advance as shown in FIG. 9. If the spatial frequency component higher than the threshold value is present, it is determined that a symbol is present in the frame memory.

Figure 10:
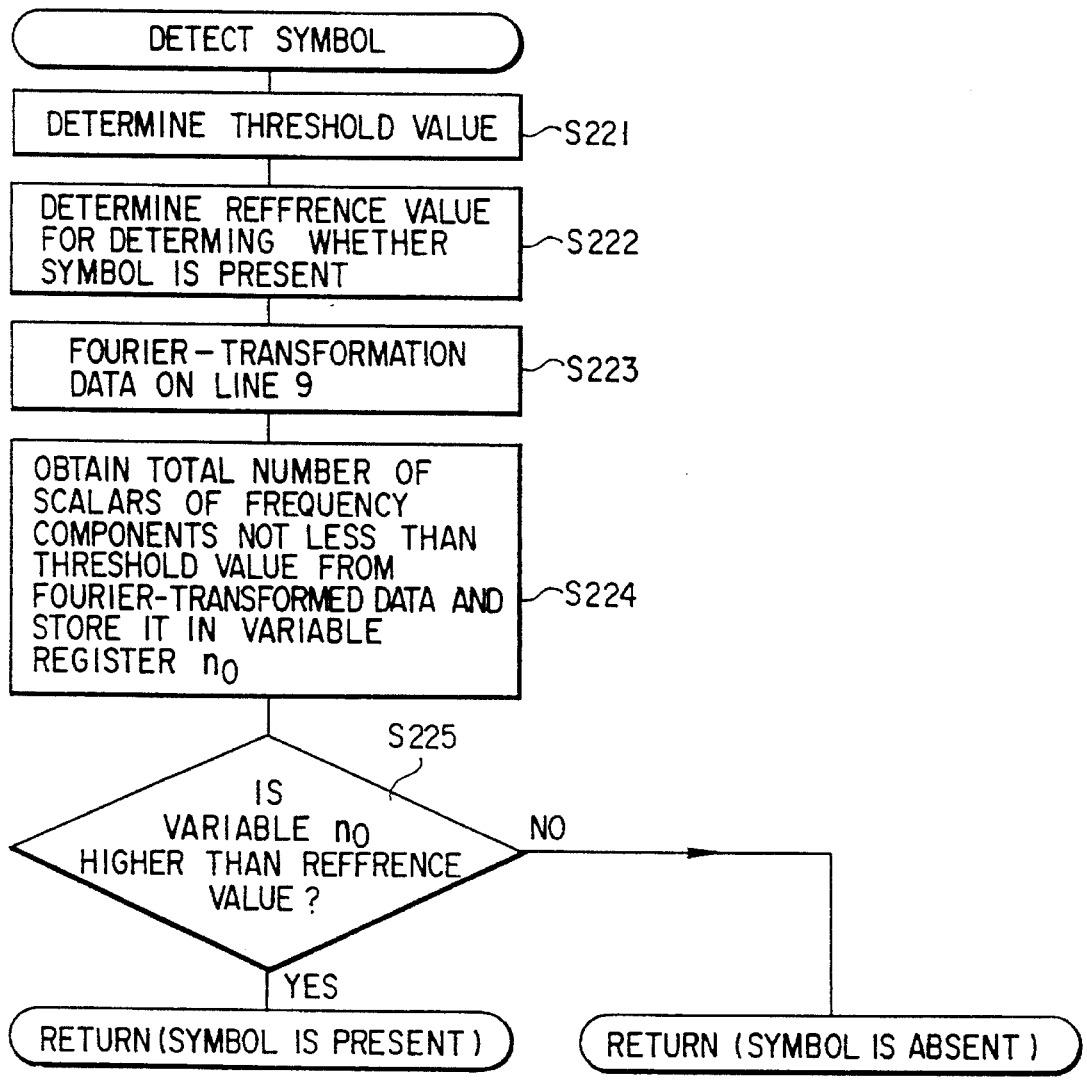
FIG. 10 is a flowchart showing a symbol detection routine according to the second embodiment.

FIG. 10 shows a flowchart of the algorithm of the second embodiment for automatically recognizing the start of decryption of image data, that is, a flowchart of the symbol detection routine of step S200 shown in the main flowchart of FIG. 4.

First, a threshold value of the spatial frequency is set in step S221, and a reference value for determining whether a symbol is present or not is set in step S222. In step S223, image data on the check line 9 is one-dimensionally Fourier-transformed. In step S224, the total number of scalars having spatial frequencies not less than the threshold value is calculated from the spatial frequency distribution, and then stored in the variable ($n_0$) register. Finally, in step S225, it is determined whether the variable $n_0$ exceeds the reference value. If yes, the flow return to the main flowchart with an information representing that the symbol is present. If no, the flow returns to the main flowchart with an information representing that the symbol is absent.

As is clearly described above, since the presence of the bar code symbol is monitored using the Fourier conversion, the apparatus can be started automatically.

The Fourier conversion of image data on the check line 9 can be replaced with one-dimensional or two-dimensional Fourier transformation of image data in the entire memory frame or Fourier transformation of image data in the central part of the frame memory. The image data of the Fourier transformation is compared with a threshold value to determine whether a symbol is present or not in the frame memory.

The Fourier transformation means mapping an image on a spatial frequency area, such as discrete Fourier transformation, discrete Fourier series development, and discrete cosine transformation.

(Third Embodiment)

A symbol information scanning apparatus according to the third embodiment of the present invention will now be described. Since the third embodiment is the same as the first embodiment except for the algorithm for automatically recognizing the start of decryption of image data, only the algorithm of the third embodiment will be described hereafter.

Like in the first embodiment, an arbitrary check line 9 is defined on the frame memory 6, as shown in FIG. 5. It is checked whether or not data of the check line includes either a start code 22 or a stop code 23.

If the data includes the code, it is determined that a bar code symbol is present in the frame memory.

FIG. 11 shows a flowchart of the algorithm of the third embodiment for automatically recognizing the start of decryption of the bar code symbol, that is, a flowchart of the symbol detection routine of step S200 shown in the main flowchart of FIG. 4.

First, in step S231, image data on the check line 9 is fetched. In step S232, it is determined whether the fetched image data includes bright and dark patterns corresponding to the start code 22. If the data includes them, it is determined that a symbol is present and the flow returns to the main flowchart with an information representing that the symbol is present. If the data does not include them, it is determined in step S233 whether the fetched image data includes bright and dark patterns corresponding to the stop code 23. If the data includes them, the flow returns to the main flowchart with an information representing that a symbol is present. If the data does not include them, it is determined that a bar code symbol is not present, and the flow returns to the main flowchart with an information representing that the symbol is absent.

As is clearly described above, since the presence of the bar code symbol is monitored using the start and stop codes 22 and 23, the apparatus can be started automatically.

(Fourth Embodiment)

A symbol information scanning apparatus according to the fourth embodiment of the present invention will now be described. Since the fourth embodiment is the same as the first embodiment except for the algorithm for automatically recognizing the start of decryption of image data, only the algorithm of the fourth embodiment will be described hereafter.

Figure 13:
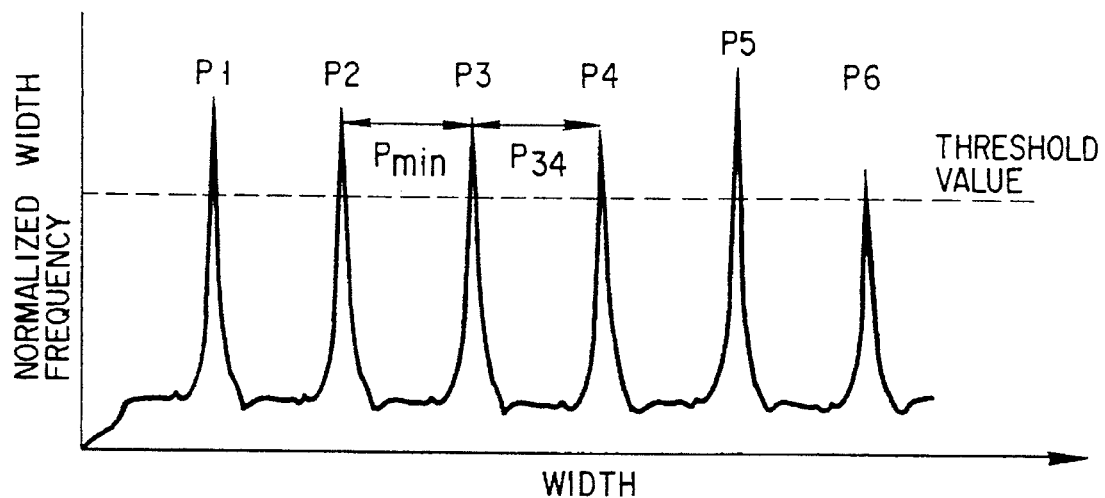
FIG. 13 is a histogram of widths of bar codes for explaining the symbol recognition algorithm according to the fourth embodiment.

Like in the first embodiment, an arbitrary check line 9 is defined on a frame memory 6, as shown in FIG. 5. The intensities of pixels on the check line 9 are represented in FIG. 12. The widths of bars and spaces of a bar code on the check line are measured (B1, B2, B3, . . . ; and S1, S2, S3, . . . ). A histogram of these widths is shown in FIG. 13. Assume that the peaks of the widths of the bars and spaces exceeding a predetermined threshold value are P1, P2, . . . , P6. Since, in general, the width of a bar code symbol is an integral multiple of the width of the narrowest bar or space, the peaks of the widths of the bars and spaces appear at regular intervals, as shown in FIG. 13. Further, an area in the frame memory other than the bar code symbol 2 exists as noise when the histogram of the widths of bars and spaces of the bar code symbol on the check line is formed, if the intervals between adjacent two peaks are the same, it is determined that the bar code symbol 2 is present.

When the minimum value of the intervals of the peaks is $P_{min}$ (an interval between P2 and P3 in FIG. 13), an interval $P_{34}$ between P3 and P4, which is adjacent to the interval $P_{min}$, is calculated. If the interval $P_{34}$ satisfies the following conditions, it can be determined that the bar code symbol 2 is present.

$$P_{min} \times n < P_{34} \leq P_{min} \times (n+\sigma)$$

(n=1, 2, 3, . . . )

σ: predetermined tolerance (0<σ<1)

The above is a formula for checking whether the interval $P_{34}$ is an integral multiple of the minimum interval $P_{min}$, σ denotes a range within which $P_{34}$ can be regarded as an integral multiple of $P_{min}$.

As described above, the symbol can be recognized by monitoring the intervals between the peaks of widths of bars and spaces of the symbol. In order to measure the intervals between the bars and spaces, a well-known image processing technique such as an edge extraction method and binarization method, can be used.

In the above embodiment, the interval $P_{34}$ adjacent to the minimum interval $P_{min}$ is used to recognize the symbol. However, a plurality of intervals can be used to recognize it more correctly.

Since the bar code symbol of the PDF-417 format has bars and spaces having different six widths, the symbol can be recognized by six peaks of the histogram of the widths (the JAN bar code symbol has four peaks). Therefore, a plurality of bar code symbols can be classified somewhat correctly. Since the inclination of the symbol has to be not more than a predetermined angle to have different six peaks, it can be limited. It is thus possible to form a symbol which can be scanned more easily for its decryption.

(Fifth Embodiment)

A symbol information scanning apparatus according to the fifth embodiment of the present invention will now be described. Since the fifth embodiment is the same as the first embodiment except for the algorithm for automatically recognizing the start of decryption of image data, only the algorithm of the fifth embodiment will be described hereafter.

Like in the first embodiment, an arbitrary check line 9 is defined on a frame memory 6 as shown in FIG. 5. The intensities of pixels on the check line 9 are represented in FIG. 6. The edges of bars and spaces are extracted from data of the pixels on the check line 9 and their number is counted. When a symbol is present in the frame memory 6, the number of edges, which depends on the rules of bar codes, is detected. When no symbol is present therein, basically, no edges can be extracted. If the number of edges is between the predetermined minimum and maximum values, then it is determined that the bar code symbol 2 is present.

Figure 14:
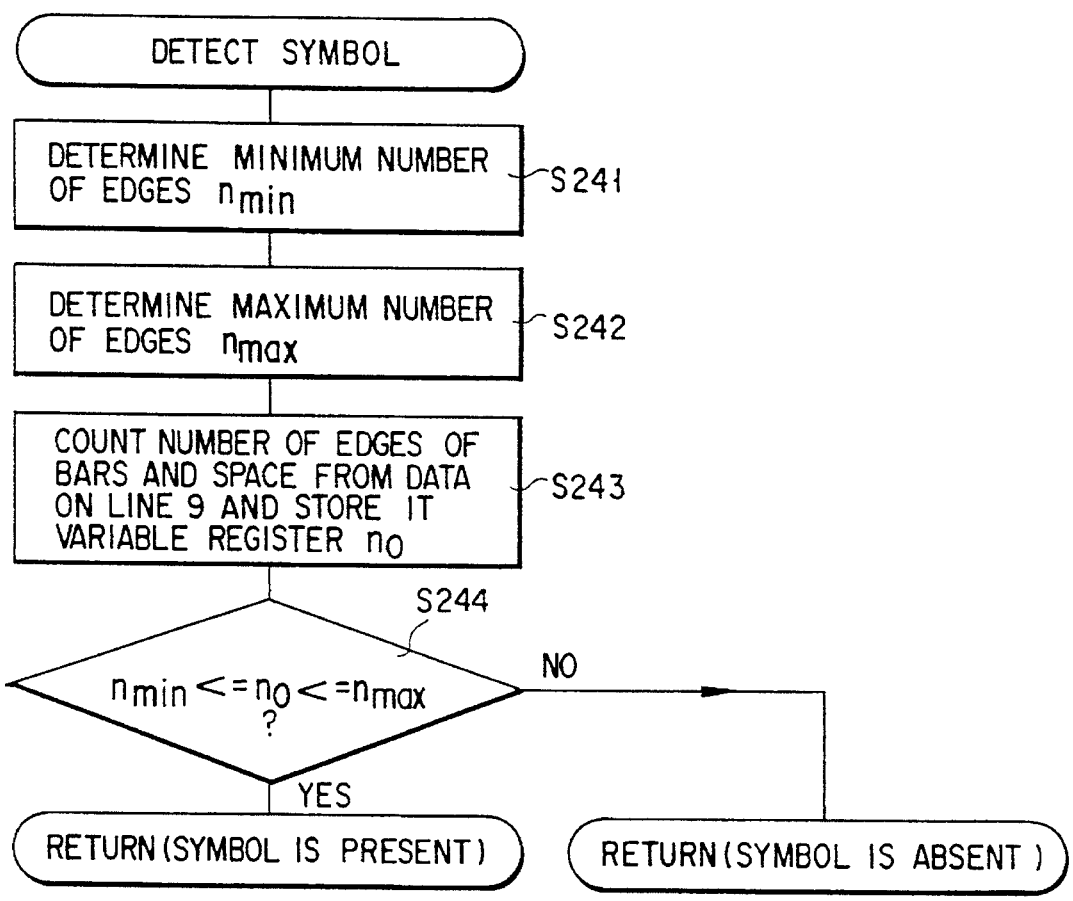
FIG. 14 is a flowchart showing a symbol detection routine according to a fifth embodiment of the present invention.

FIG. 14 shows a flowchart of the algorithm of the fifth embodiment for automatically recognizing the start of decryption of the bar code symbol, that is, a flowchart of the symbol detection routine of step S200 shown in the main flowchart of FIG. 4.

First, the minimum number $n_{min}$ of edges is set in step S241, and the maximum number $n_{max}$ of edges is set in step S242. In step S243, the edges of bars and spaces are extracted from image data on the check line 9, and their number is counted and then stored in the variable ($n_0$) register. In step S244, it is determined whether the variable $n_0$ is between the minimum number $n_{min}$ and the maximum number $n_{max}$. If yes, the flow returns to the main flowchart with an information representing that the bar code symbol is present. If no, the flow returns to the main flowchart with an information representing that the symbol is absent.

As is clearly described above, since the symbol is recognized by monitoring the number of edges of the bars and spaces, the apparatus can be started automatically.

Since the JAN bar code includes 30 bars, it can be determined that the bar code is present only when sixty edges are detected.

As described above, the symbol can be recognized by detecting the number of edges. If the conditions for restricting the number of edges are set properly, a plurality of bar codes can be classified roughly.

(Sixth Embodiment)

A symbol information scanning apparatus according to the sixth embodiment of the present invention will now be described. Since the sixth embodiment is the same as the first embodiment except for the algorithm for automatically recognizing the start of decryption of image data, only the algorithm of the sixth embodiment will be described hereafter.

Like in the first embodiment, an arbitrary check line 9 is defined on a frame memory 6, as shown in FIG. 5. The intensities of pixels on the check line 9 are shown in FIG. 6.

As has been described with regard to the first embodiment, a loop of the image pickup routine and the symbol detection routine is executed until a symbol is detected.

In general, there is no correlation in image density between when a symbol is detected and when a symbol is not detected. Thus, the correlation between image data whose symbol is detected this time and image data whose symbol was detected last time, varies from conditions to conditions. More specifically, the degree of correlation between them is high when the symbol was and is present as well as when the symbol neither was nor is present. If, however, the symbol was not present last time but is this time, or it is not present this time but was last time, the degree of correlation is low. Monitoring the correlation between the image data on the check line 9 every frame memory, it can be detected when the symbol is inserted and when it is extracted.

The intensities of images on the check line 9 are compared with one another and, if there is a big difference among them, the bar code symbol 2 is recognized.

Figure 15:
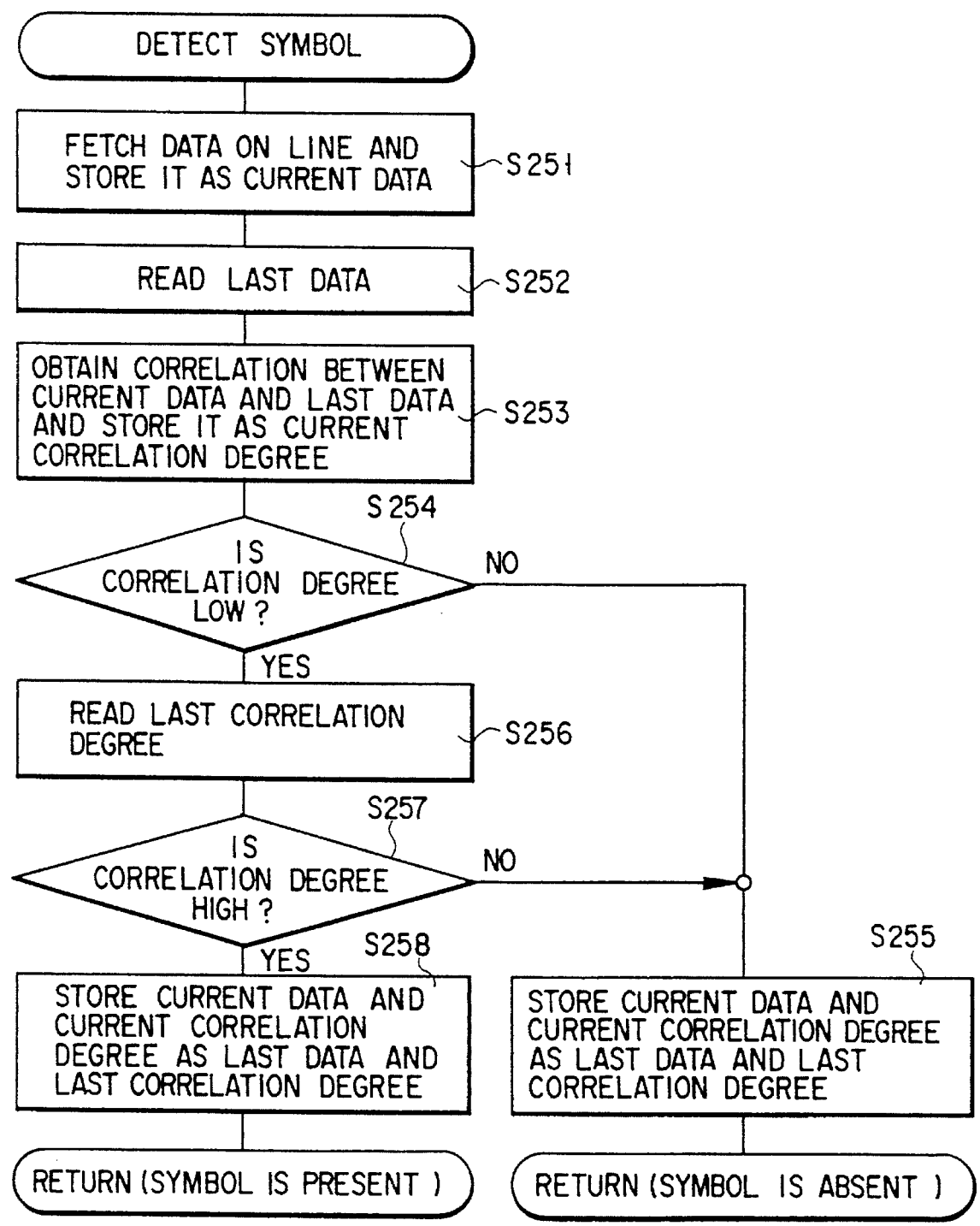
FIG. 15 is a flowchart showing a symbol detection routine according to a sixth embodiment of the present invention.

FIG. 15 shows a flowchart of the algorithm of the sixth embodiment for automatically recognizing the start of decryption of the bar code symbol, that is, a flowchart of the symbol detection routine of step S200 shown in the main flowchart of FIG. 4.

First, in step S251, image data is fetched from the check line 9, and stored in a memory (not shown) as the current image intensity data. In step S252, the last image intensity data is read out from the memory. In step S253, a correlation between the current and last image intensity data is obtained, and the degree of the correlation is stored in the memory as the current correlation degree data. It is then determined in step S254 whether or not the correlation degree is low. If the correlation degree is high, in step S255, the current image intensity data and the correlation degree data, both of which are stored in the memory, are stored as the last image intensity data and the correlation degree data, then it is determined that no symbol is present. The flow thus returns to the main flowchart with an information representing that a symbol is absent.

If it is determined in step S254 that the correlation degree is low, in steps S256 and S257, the last correlation degree data is read out from the memory, and it is determined whether the last correlation degree is high or not. If it is high, in step S258, the current image intensity data and the correlation degree data are stored as the last image intensity data and the correlation degree data, it is determined that the symbol is present, and the flow returns to the main flowchart with an information representing that a symbol is present. If it is low, in step S255, the current image intensity data and the correlation degree data are stored as the last image intensity data and the correlation degree data, it is determined that the symbol is not present, and the flow returns to the main flowchart with an information representing that a symbol is absent.

As described above, the symbol is detected by detecting the correlation degree between frames, and the apparatus can thus be started automatically.

In the sixth embodiment, the above correlation degree can be detected, using a correlation coefficient or intensities of pixels on the check line. It can also be detected simply using amount of difference.

(Seventh Embodiment)

A symbol information scanning apparatus according to the seventh embodiment of the present invention will now be described.

Figure 16:
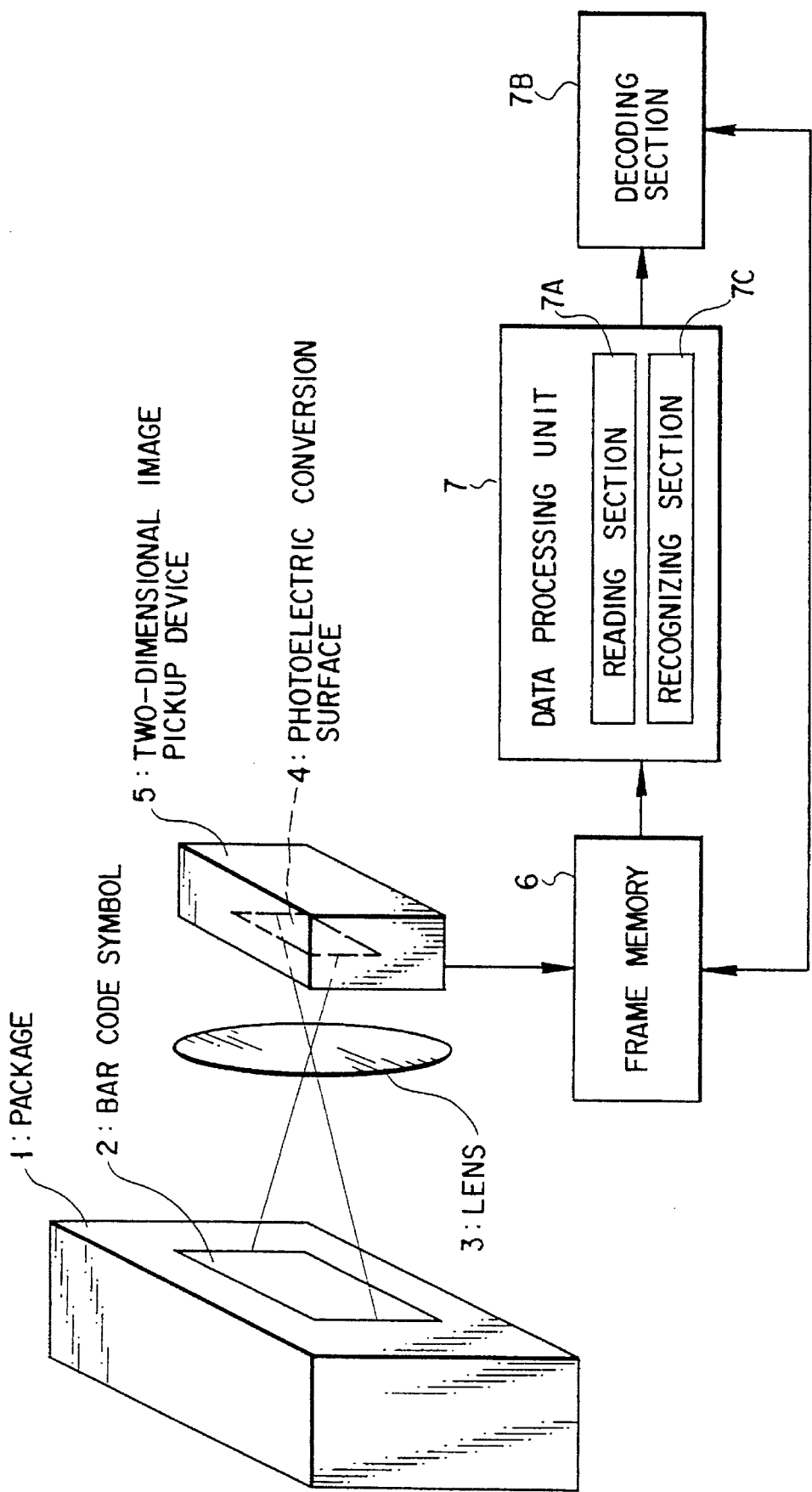
FIG. 16 is a view of a structure of a symbol information scanning apparatus according to a seventh embodiment of the present invention.

In this apparatus, as shown in FIG. 16, a decoding section 7B is separated from a data processing unit 7 and incorporated in a host apparatus. A recognizing section 7C of the data processing unit 7 recognizes whether a symbol is present or not, and supplies a start signal representing an instruction of the start of decryption to the decoding section 7B. In response to the start signal, the decoding section 7B extracts the original information from an image of bar code symbol 2 fetched in a frame memory 6.

The algorithm of the first to sixth embodiments can be applied to the seventh embodiment. Further, the apparatus can be started automatically, as in the first to sixth embodiments.

(Other Embodiments)

In the first to seventh embodiments, a single check line is used (see FIG. 5). If, however, a plurality of check lines is used, a symbol can be scanned more precisely. Since an image of one frame memory is usually fetched in 1/30 second, it is desirable to define as many lines as possible within 1/30 second. For example, four lines can be defined in each of longitudinal and lateral direction in the frame, and two lines can be defined in a diagonal direction.

The above simply shows that, when it is determined that a symbol is present, the symbol is decoded using its image data. Usually, the bar code symbol 2 is manually or mechanically inserted in an image pickup area, and an image of the symbol 2 may be blurred in accordance with timing in which the image is fetched. Taking into consideration the blur of the image, it is desirable that, if the symbol is detected by a symbol detection routine, the symbol be imaged again for its detection and decryption, or the symbol be imaged again for its decryption only, after a lapse of predetermined wait time.

The two-dimensional image pickup device 5 is not limited to a two-dimensional CCD and an image pickup tube each having an area sensor. They can be replaced with a combination of a one-dimensional image pickup element and a one-dimensional scan mechanism and that of a photoelectric detector and a two-dimensional scan mechanism. Though the frame memory 6 covers all the image pickup area, it has only to cover at least an area for one line. Though the PDF-D417 bar code is used as a bar code symbol in the above embodiments, it can be replaced with a stacked bar code such as CODE 49 and a one-dimensional bar code such as the JAN code.

Furthermore, a method of automatically recognizing the start of decryption of data on the frame memory 6 is simply described above. The present invention is not limited to this method, but a video signal can be processed by hardware before it is supplied to the frame memory 6. Although, in this case, the number of circuits is increased, the operation speed is increased advantageously. Particularly in the second embodiment, if the video signal is processed by the hardware before it is supplied to the frame memory, the discrete Fourier transformation need not be performed.

As described in detail, since it is automatically checked whether a bar code symbol is projected on the photoelectric conversion surface to start scanning bar code information, the apparatus can be driven automatically by monitoring the output from the image pickup tube, without putting a burden on an operator.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A symbol information reading apparatus for recognizing whether a bar code symbol including bars and spaces is present, and for thereafter reading the bar code symbol, the apparatus comprising:

an image pickup device for picking up an entire image of the bar code symbol and for outputting image pickup data;

recognizing means for detecting a frequency of pixels corresponding to widths of the bars and spaces of the picked up image of the bar code symbol, based on the image pickup data received from said image pickup device, and for automatically recognizing whether a bar code symbol is present according to whether peaks of the widths having a frequency exceeding a predetermined threshold value have a predetermined interval; and instruction means for issuing an instruction to start decoding information supplied from said image pickup device only when said recognizing means recognizes that the bar code symbol is present.

2. The apparatus according to claim 1, wherein said predetermined interval of the peaks of the widths is a substantially constant value.

3. The apparatus according to claim 1, further comprising decoding means for decoding the information supplied from said image pickup device in response to the instruction issued from said instruction means.

4. A. A symbol information reading apparatus for recognizing whether a bar code symbol including bars and spaces is present, and for thereafter reading the bar code symbol, the apparatus comprising:

an image pickup device for picking up an entire image of the bar code symbol and for outputting image pickup data;

recognizing means for detecting a frequency of pixels corresponding to widths of the bars and spaces of the picked up image of the bar code symbol, based on the image pickup data received from said image pickup device, and for automatically recognizing whether a bar code symbol including bars and spaces is present according to whether:

peaks of the widths having a frequency exceeding a predetermined threshold value have a predetermined interval having a minimum width, there are six peaks of the widths, and a maximum width of a bar or space is six times as large as the minimum width thereof; and instruction means for issuing an instruction to start decoding information supplied from said image pickup device only when said recognizing means recognizes that the bar code symbol is present.

5. The apparatus according to claim 4, wherein said predetermined interval of the peaks of the widths is a substantially constant value.

6. The apparatus according to claim 4, further comprising decoding means for decoding the information supplied from said image pickup device in response to the instruction issued from said instruction means.

\* \* \* \* \*